(12) United States Patent
Yoon et al.

(10) Patent No.: US 8,498,488 B2
(45) Date of Patent: Jul. 30, 2013

(54) METHOD AND APPARATUS TO DETERMINE ROBOT LOCATION USING OMNI-DIRECTIONAL IMAGE

(75) Inventors: Sukjune Yoon, Seoul (KR); Kyung Shik Roh, Seongnam-si (KR); Woosup Han, Yongin-si (KR); Seung Ki Min, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1285 days.

(21) Appl. No.: 11/830,883

(22) Filed: Jul. 31, 2007

(65) Prior Publication Data

US 2008/0075357 A1   Mar. 27, 2008

(30) Foreign Application Priority Data

Sep. 26, 2006  (KR) .................. 10-2006-0093653

(51) Int. Cl.
*G06K 9/46* (2006.01)
*G06K 9/00* (2006.01)
*G06F 19/00* (2006.01)
*G05B 19/18* (2006.01)

(52) U.S. Cl.
USPC .......... 382/207; 382/181; 700/245; 700/253; 700/259; 348/36

(58) Field of Classification Search
USPC .. 382/181, 190, 195, 203, 206, 207; 700/245, 700/253, 259; 348/36–39
See application file for complete search history.

(56) References Cited

U.S. PATENT DOCUMENTS

| | | | |
|---|---|---|---|
| 5,920,337 A * | 7/1999 | Glassman et al. | 348/36 |
| 7,684,894 B2 * | 3/2010 | Sakai et al. | 700/245 |
| 7,689,321 B2 * | 3/2010 | Karlsson | 700/253 |
| 7,774,158 B2 * | 8/2010 | Domingues Goncalves et al. | 702/152 |
| 2004/0239756 A1 * | 12/2004 | Aliaga et al. | 348/36 |

FOREIGN PATENT DOCUMENTS

| | | |
|---|---|---|
| JP | 10-160463 | 6/1998 |
| JP | 2004-326314 | 11/2004 |

OTHER PUBLICATIONS

Yagi et al., "Route representation for mobile robot navigation by omnidirectional route panorama Fourier Transformation," IEEE International Conference on Robotics and Automation (1998), vol. 2, pp. 1250-1255.*
Matsui et al., "Mobile robot localization using circular correlations of panoramic images," IEEE/RSJ International Conference on Intelligent Robots and Systems (2000), pp. 269-274.*
Yagi et al., "Iconic memory-based omnidirectional route panorama navigation," IEEE International Conference on Robotics and Automation (2003), vol. 1, p. 14-19.*

(Continued)

*Primary Examiner* — Anand Bhatnagar
*Assistant Examiner* — Soo Park
(74) *Attorney, Agent, or Firm* — Stanzione & Kim, LLP

(57) ABSTRACT

A method to determine the location of a robot using an omni-directional image, the method including acquiring an omni-directional image from a robot, extracting a predetermined current line from the acquired omni-directional image, calculating a correlation coefficient between the extracted current line of the robot and each landmark line of pre-stored nodes using a Fast Fourier Transform (FFT), and performing a stochastic approach method of a particle filtering process on a basis of the calculated correlation coefficient to recognize a location of the robot.

12 Claims, 12 Drawing Sheets

OTHER PUBLICATIONS

Lee et al., "Feature matching in omnidirectional images with a large sensor motion for map generation of a mobile robot," Pattern Recognition Letters (2004), vol. 25, No. 4, pp. 413-427.*

Cauchois et al., "Robotic assistance: an automatic wheelchair tracking and following functionality by omnidirectional vision," IEEE/RSJ International Conference on Intelligent Robots and Systems (2005), pp. 2560-2565.*

Jang et al., "PR-SLAM in particle filter framework," IEEE International Symposium on Computational Intelligence in Robotics and Automation (2005), pp. 327-333.*

Briggs et al., "Feature matching across 1D panoramas," In Omnivis 2005, the sixth Workshop on Omnidirectional Vision (2005).*

Jang et al., "Metric localization using a single artificial landmark for indoor mobile robots," IEEE/RSJ International COnference on Intelligent Robots and Systems (2005), pp. 2857-2863.*

Kobayashi et al., "Absolute speed estimation from sequential frames of omni-directional image," SICE 2003 Annual Conference (2003), pp. 2016-2019.*

Chinese Office Action issued Jun. 1, 2010 in CN Application No. 200710141899.9.

* cited by examiner

<CURRENT-LINE MODIFICATION>

PARTICLES

METHOD AND APPARATUS TO DETERMINE ROBOT LOCATION USING OMNI-DIRECTIONAL IMAGE

CROSS-REFERENCE TO RELATED APPLICATIONS

This application claims priority under 35 U.S.C. §119(a) from Korean Patent Application No. 2006-0093653, filed on Sep. 26, 2006 in the Korean Intellectual Property Office, the entire disclosure of which is incorporated herein by reference.

BACKGROUND OF THE INVENTION

1. Field of the Invention

The present general inventive concept relates to a method and apparatus to determine a location of a robot (i.e., a method to locate the robot), and more particularly to a method and apparatus to determine the location of a robot using an omni-directional camera on the robot to acquire an omni-directional image.

2. Description of the Related Art

Generally, an omni-directional camera is adapted to acquire an omni-directional image, and can acquire an image of 360° in a vicinity of the camera.

In recent times, the omni-directional camera is mounted to a moving robot in order to recognize a current location of the robot.

A representative example of the above-mentioned omni-directional camera mounted to the moving robot to recognize the location of the robot has been disclosed in Japanese Patent Laid-open No. 10-160463, published on Jun. 19, 1998, which is hereby incorporated by reference. The above-mentioned Japanese Patent Laid-open No. 10-160463 sets a plurality of nodes to specific locations contained in a motion space, moves the moving robot, equipped with the omni-directional camera, to the individual nodes, and stores omni-directional images captured at the individual nodes. Thereafter, the above-mentioned Japanese Patent Laid-open No. 10-160463 moves the moving robot to a specific location, acquires an omni-directional image at the specific location, measures a similarity between the acquired omni-directional image and the pre-stored omni-directional image at each node, and predicts a current location as a starting point of the corresponding node, such that the location of the robot can be recognized.

However, the above-mentioned Japanese Patent Laid-open No. 10-160463 uses a Sum of Absolute Differences (SAD) correlation value to measure the similarity between the current omni-directional image of the robot at the specific location and the pre-stored omni-directional images of each node. The above-mentioned example using the SAD correlation value must directly compare an omni-directional image acquired at each rotation angle of the moving robot with an omni-directional image at each node, such that the number of calculations geometrically increases in proportion to the number of nodes. As a result, it is impossible to recognize the location of the robot in real time, and it is difficult for a user to correctly recognize the location of the robot due to accumulated errors encountered by the increased number of calculations.

In addition, the above-mentioned method cannot recognize the correct location of the robot, and has been designed only to roughly predict which one of the nodes is adjacent to the robot, such that the user has difficulty in recognizing the correct location of the robot.

SUMMARY OF THE INVENTION

The general inventive concept provides a method to determine a robot location to easily process a correlation coefficient between an omni-directional image of an omni-directional camera mounted on a robot and an image acquired at a reference node of a map at high speed, such that the location of the robot can be easily and quickly recognized on a basis of the reference node used as a starting point.

The general inventive concept also provides a method to locate a robot which uses a stochastic approach method of particle filtering on the basis of the correlation coefficient between the omni-directional image of the omni-directional camera mounted on the robot and the reference-node image of the map, allows measurement data to be insensitive to noise and a location error, correctly recognizes the robot location, and quickly copes with an unexpected situation in which the robot abruptly moves or is moved to another location.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method to locate a robot using an omni-directional image, the method including acquiring an omni-directional image from a robot, extracting a predetermined current line from the acquired omni-directional image, calculating a correlation coefficient between the extracted current line of the robot and each landmark line of pre-stored nodes using a Fast Fourier Transform (FFT), selecting a node at which the calculated correlation coefficient is equal to or higher than a predetermined value; and recognizing a location of the robot on a basis of the selected node.

The foregoing and/or other aspects and utilities of the present general inventive concept may also be achieved by providing a method to locate a robot using an omni-directional image, the method including acquiring an omni-directional image from a robot, extracting a predetermined current line from the acquired omni-directional image, calculating a correlation coefficient between the extracted current line of the robot and each landmark line of pre-stored nodes using a Fast Fourier Transform (FFT), and performing a stochastic approach method of a particle filtering process on a basis of the calculated correlation coefficient to recognize a location of the robot.

The foregoing and/or other aspects and utilities of the present general inventive concept may also be achieved by providing a method to locate a robot with an omni directional camera mounted thereon, the method including setting a number landmark lines for a predetermined number of nodes within a robot-locatable area, acquiring an omni directional image from the robot, extracting a current line from the acquired image, calculating a correlation coefficient between the current line and the landmark lines for each node, and determining a location of the robot based on the calculated correlation coefficient.

The calculating of the correlation coefficient may use a Fast Fourier Transform (FFT) method.

The correlation coefficient may be calculated by:

$$\rho(\tau) = \frac{C_{xy}(\tau)}{\sqrt{C_{xx}(0) \cdot C_{yy}(0)}}$$

wherein $\rho(\tau)$ is a correlation coefficient, $\tau$ is a rotation angle of the robot, $C_{xy}$ is a cross-correlation value, and $C_{xx}$ and $C_{yy}$ are correlation values.

The determining of the location may include selecting a node at which the calculated correlation coefficient is equal to or higher than a predetermined value.

The determining of the location may include selecting a first number of nodes at which the calculated correlation coefficient is equal to or higher than a predetermined value, modifying the current line into a plurality of wrapped current lines such that spatial objects in each wrapped current line are at the same location with corresponding spatial objects in each of the landmark lines for the first number of nodes, calculating a second correlation coefficient between the wrapped current lines and the landmark lines of the first number of nodes, selecting a second number of nodes among the first number of nodes at which the second calculated correlation coefficient is equal to or higher than a second predetermined value, and recognizing a location of the robot on the basis of the selected second number of nodes.

The modifying of the current line may include extracting an edge of the current line and an edge of each landmark line of the first number of nodes, and matching the edge of the current line with the edge of the landmark lines.

The recognizing of the location may use a stochastic approach of a particle filtering process to determine the location of the robot.

The recognizing of the location may include randomly dispersing particles on the robot-locatable area based on a robot-adjacent node selected from the second number of nodes based on the second correlation coefficient, extracting the particles based on a probability value indicating that the robot is located at the dispersed particles, and recognizing a current location of the robot based on the extracted particles.

The recognizing of the location may include randomly dispersing particles on the robot-locatable area based on a specific node determined by the calculated correlation coefficient from among the second number of nodes, assigning a weight to the particles based on a probability value indicating that the robot is located at the dispersed particles, randomly extracting the dispersed particles based on a value to which the weight is added, and recognizing a current location of the robot based on the randomly extracted particles.

The predetermined value and the second predetermined value may be the same.

The edge may be an end point at which each RGB of the current line changes by at least a third predetermined value.

The foregoing and/or other aspects and utilities of the present general inventive concept may also be achieved by providing a computer readable recording medium comprising computer readable codes to locate a robot using an omni-directional image, including acquiring the omni-directional image from the robot, extracting a predetermined current line from the acquired omni-directional image, calculating a correlation coefficient between the extracted current line of the robot and each landmark line of pre-stored nodes using a Fast Fourier Transform (FFT), selecting a node at which the calculated correlation coefficient is equal to or higher than a predetermined value, and recognizing a location of the robot on a basis of the selected node.

The foregoing and/or other aspects and utilities of the present general inventive concept may also be achieved by providing a robot locating apparatus, including a robot body, an omni-directional camera mounted on the robot body to acquire an omni-directional image, and a controller to extract a predetermined current line from the acquired omni-directional image, to calculate a correlation coefficient between the extracted current line of the robot and each landmark line of pre-stored nodes of a robot locatable area using a Fast Fourier Transform (FFT), and to select a node at which the calculated correlation coefficient is equal to or higher than a predetermined value to recognize a location of the robot based on the selected node.

The controller may be mounted on the robot body.

The controller may be mounted apart from the robot body and may communicate with at least one of the robot body and the omni-directional camera.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
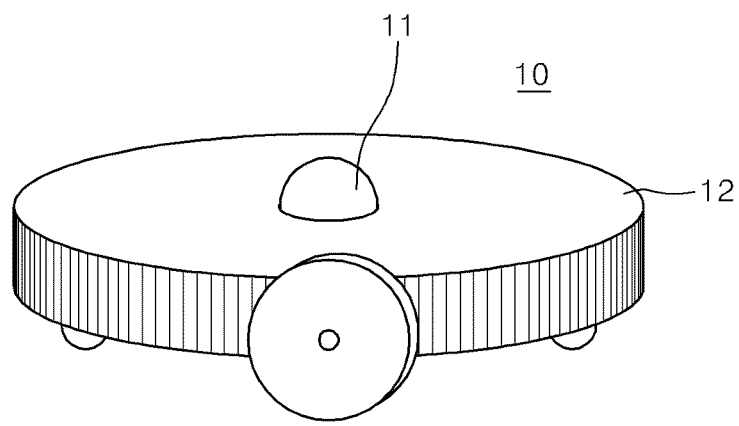
FIG. 1 illustrates a moving robot equipped with an omni-directional camera according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below to explain the present general inventive concept by referring to the figures.

Figure 2:
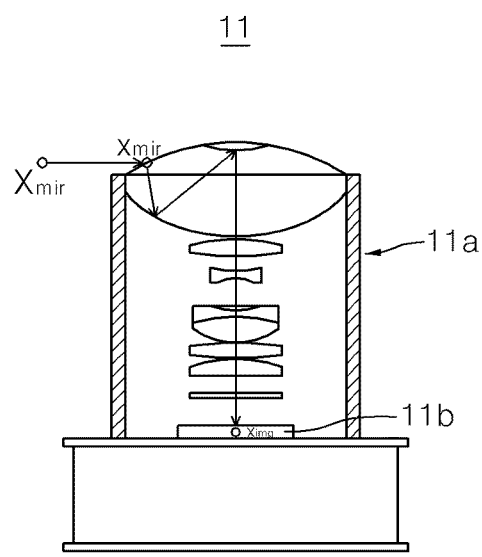
FIG. 2 is a conceptual diagram illustrating the omni-directional camera illustrated in FIG. 1 according to an embodiment of the present general inventive concept.

Referring to FIGS. 1 and 2, a moving robot equipped with an omni-directional camera 10 may include an omni-directional camera 11 and a robot body 12. The omni-directional camera 11 may include an omni-directional lens 11a and a CCD element 11b.

Referring to FIG. 2, a curved mirror can be attached to a front part of the omni-directional camera 11, such that an image of 360° in a vicinity of the omni-directional camera 11 can be acquired. As denoted by an arrow direction, a spatial point Xmir is reflected at a specific point xmir located on the curved mirror, such that an image is formed on the CCD element 11b, resulting in the occurrence of a point ximg on a final image. In this way, an image of 360° in the vicinity of the omni-directional camera 11 is acquired.

The present general inventive concept applies a correlation coefficient extraction method and a particle filtering method to the omni-directional image acquired from the above-mentioned omni-directional camera and a current line of the image map, such that it can correctly predict and/or recognize a location of the moving robot 10. In this case, the correlation coefficient extraction method is calculated by a Fast Fourier Transform (FFT) scheme, and the particle filtering method employs a correlation coefficient extracted by the correlation coefficient extraction method. Also in this case, the current line is indicative of an image of a specific line parallel to the surface of the omni-directional image, and always indicates the same direction.

Figure 3:
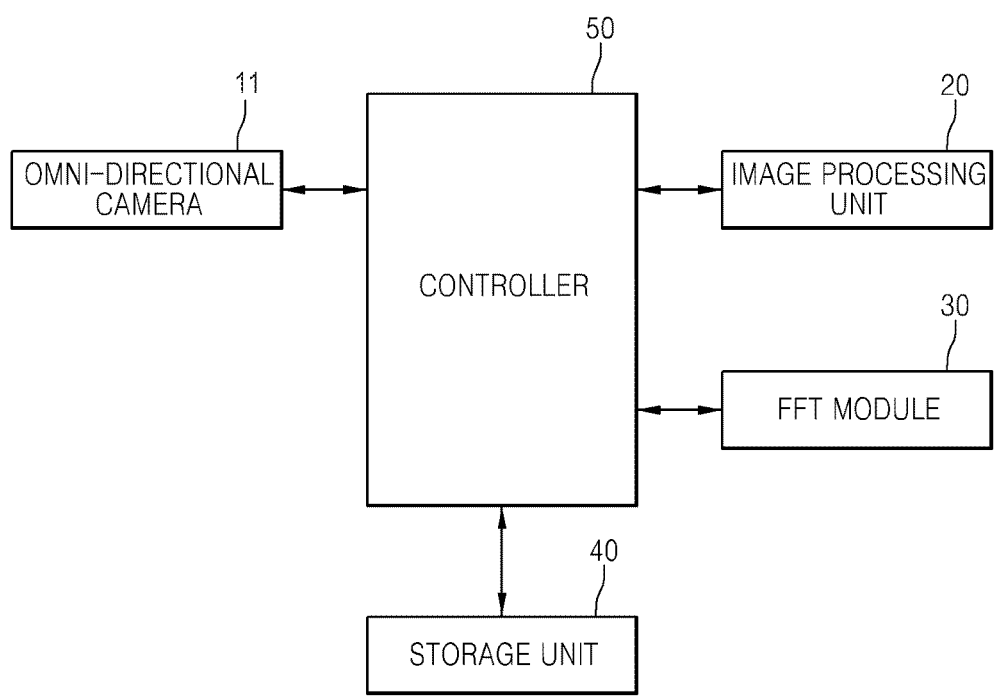
FIG. 3 is a block diagram illustrating a method to locate a robot according to an embodiment of the present general inventive concept.

As illustrated in FIG. 3, a system to determine the location of the moving robot 10 using the above operations may include a controller 50 to control overall control operations of the omni-directional camera 11 and the moving robot 10. The controller 50 may be located on the robot body 12 and may control or include the omni-directional camera 11, an image processing unit 20, a FFT module 30, and a storage unit 40, which can be electrically connected to each other. Alternatively, the omni-directional camera 11 may be mounted on the robot body 12, and the controller 50 may be disposed apart from the robot body 12 to communicate with the moving robot 10 and may include the image processing unit 20, the FFT module 30, and the storage unit 40.

Figure 4:
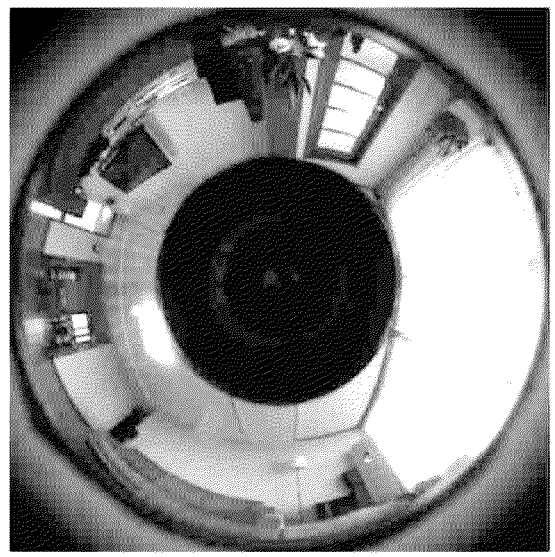
FIG. 4 illustrates the omni-directional image captured by the omni-directional camera of FIG. 1 according to an embodiment of the present general inventive concept.

The image processing unit 20 can perform pre-processing of the omni-directional image of a peripheral part of the omni-directional camera. For example, the image processing unit 20 can cut out a meaningless part from the omni-directional image, and can perform a histogram-smoothing process on a remaining donut-shaped image, in such a way that the pre-processing of the omni-directional image is performed (see FIG. 4). As a result, the omni-directional image can become insensitive to illumination irrespective of a brightness.

Figure 5:
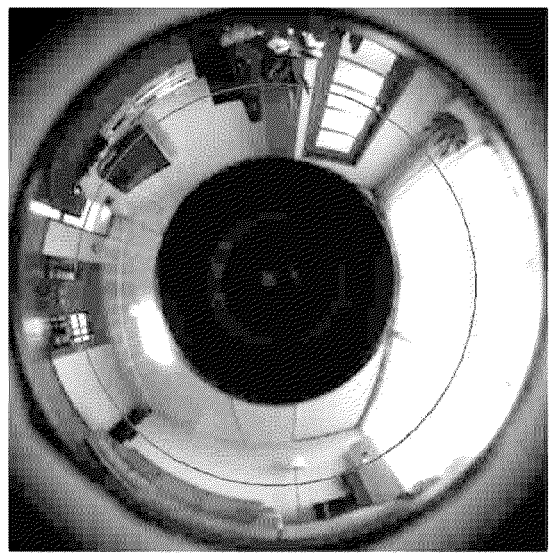
FIG. 5 illustrates a current line of the omni-directional image illustrated in FIG. 4 according to an embodiment of the present general inventive concept.

The controller 50 can extract a current line corresponding to a current line contained in the image from the pre-processed image received from the image processing unit 20, as denoted by a circumference on the image of FIG. 5. In this case, a resolution (RGB) of the current line may be a square of 2 (i.e., 22) according to FFT characteristics, and the current line may be pre-set to a predetermined location on the basis of the origin of the omni-directional image.

The FFT module 30 can select a series of time samples using a numerical calculation based on the Fourier Transform scheme, measures frequency components of the selected time samples, and calculates how much energy will occur in the time-sample sequence using a variety of frequencies. In this case, the Fourier Transform scheme transforms expressions of the numerical sequences contained between the frequency domain and the time domain. Provided that the above-mentioned Fourier Transform scheme is performed at high speed, a Fast Fourier Transform scheme can be implemented. Although the Fourier Transform scheme can also calculate a RGB sequence having a specific length, the RGB of the current line can be set to the square of 2 in order to maximize FFT advantages. The storage unit 40 can also pre-extract each landmark line from each reference node contained in the image map.

The controller 50 can calculate a correlation coefficient between the current line of the current omni-directional image of the robot 10 and the landmark line of each reference node using the FFT module 30, such that the resultant data becomes insensitive to noise and can also be processed at high speed. In the case of using the FFT scheme, each correlation coefficient and rotation angle of the robot 10 are automatically processed at the same time, such that there is no need to calculate the correlation coefficient between two images at each rotation angle, resulting in an implementation of a high-speed calculation. As a result, the controller 50 can recognize the location of the robot 10 in real time.

The controller 50 can calculate a correlation coefficient between the current line of the current omni-directional image of the robot and a landmark line of each reference node pre-stored in the storage unit 40 using an equation such as:

$$\rho(\tau) = \frac{C_{xy}(\tau)}{\sqrt{C_{xx}(0) \cdot C_{yy}(0)}}$$ [Equation 1]

where $\rho(\tau)$ is indicative of the correlation coefficient, $\tau$ is indicative of a rotation angle of the robot 10, $C_{xy}$ is indicative of a cross-correlation value, and $C_{xx}$ and $C_{yy}$ are indicative of correlation values.

As can be seen from Equation 1, the closer the absolute value of the correlation coefficient is to a specific value "1", the higher the similarity between two omni-directional images. Also, $C_{xy}$ can be calculated by the FFT scheme.

The controller 50 can calculate a correlation coefficient between a current line of the current omni-directional image of the robot 10 and a landmark line of each reference node pre-stored in the storage unit 40 using Equation 1, and correctly recognizes which one of reference nodes is adjacent to the robot 10 using the calculated correlation coefficient. For example, the robot 10 may predict that it is located in the vicinity of a reference node having the highest correlation coefficient from among several correlation coefficients, such that the location of the robot 10 can be recognized.

However, in the case of using the above-mentioned operation, the recognized location of the robot 10 may be incorrect due to occurrences of erroneous factors (e.g., a location error and noise), such that a specific process capable of solving the erroneous factors must be performed to more correctly recognize the location of the moving robot 10.

For this purpose, the controller 50 can select a number (M) of nodes having a high correlation coefficient from among several correlation coefficients calculated by Equation 1, can calculate a specific correlation coefficient insensitive to noise by modifying a current line on a basis of each landmark line of the M nodes, and can perform a particle filtering process using the correlation coefficient of each node, such that it recognizes a current location of the robot 10.

Figure 6:
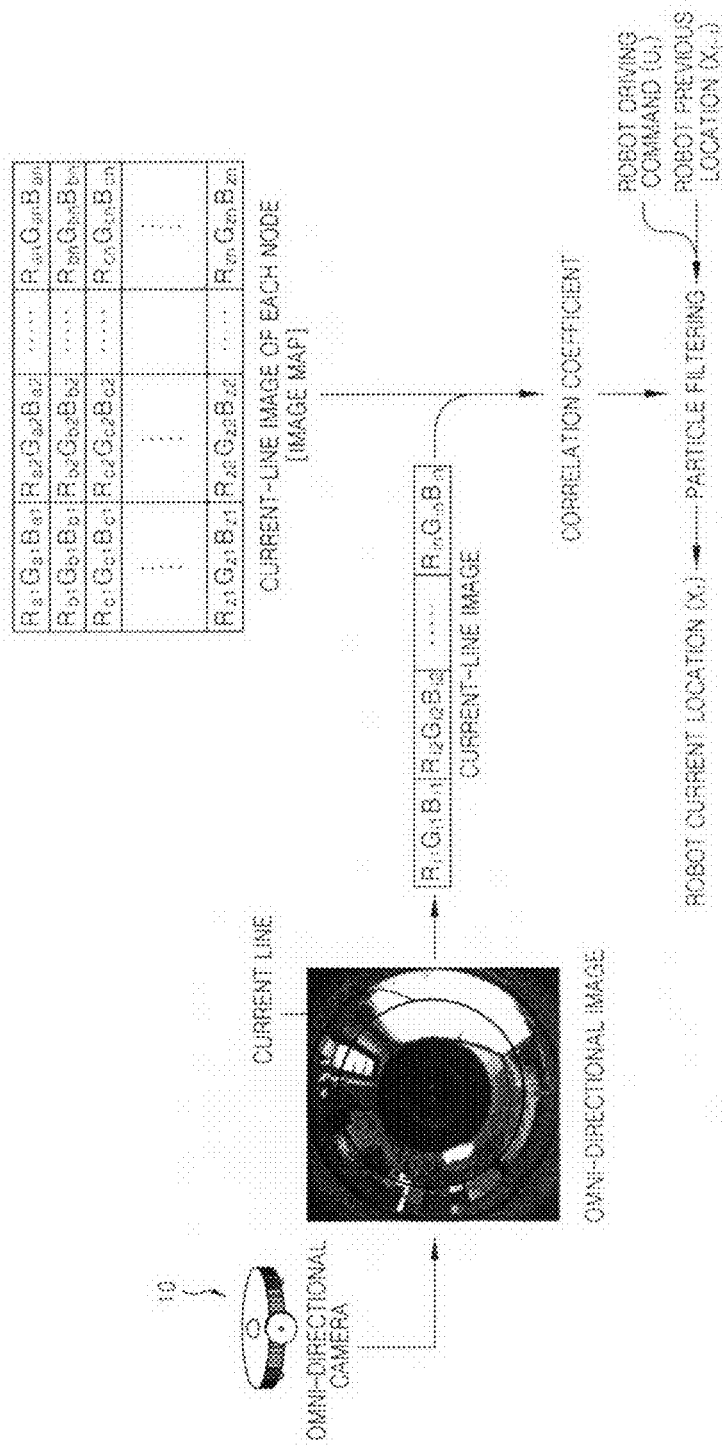
FIG. 6 is a diagram illustrating a robot localization system according to an embodiment of the present general inventive concept.

In more detail, as illustrated in FIG. 6, the controller 50 extracts a current line from the robot's omni-directional image captured by the omni-directional camera, calculates a correlation coefficient between the extracted current line of the robot and a landmark line of each reference node of the image map using the FFT scheme, and performs the particle filtering method according to the driving command of the robot 10 and the current location of the robot 10 in order to correctly predict the current location of the robot 10, such that it can recognize the current location of the robot 10. In this case, the current line has several RGB values in a length direction.

Figure 7:
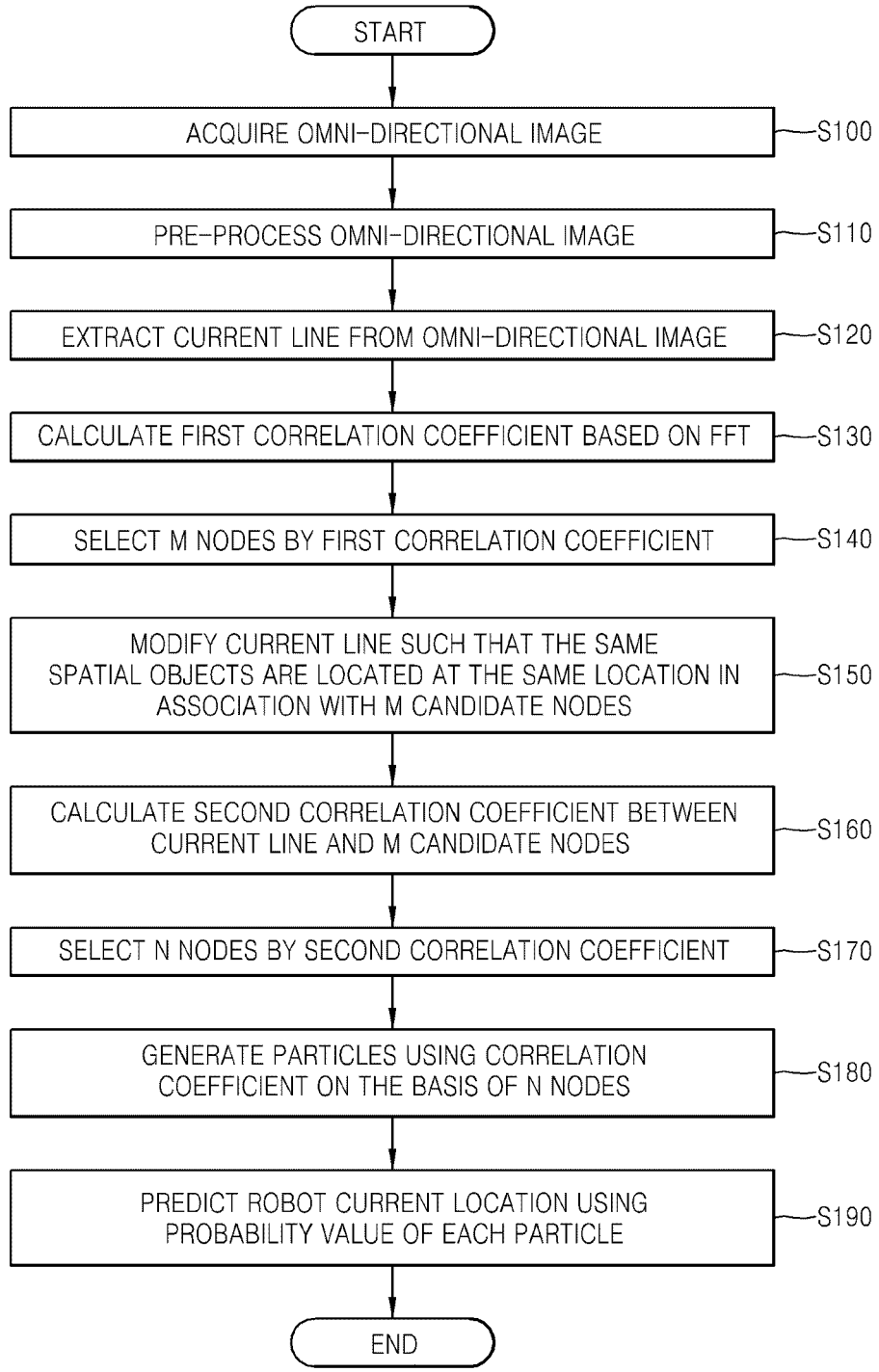
FIG. 7 is a flow chart illustrating a method to locate a robot according to an embodiment of the present general inventive concept.

FIG. 7 is a flow chart illustrating a method to locate a robot according to an embodiment of the present general inventive concept. Referring to FIGS. 3 and 7, the controller 50 acquires an omni-directional image from the omni-directional camera 11 mounted on the moving robot 10 at operation S100, and performs a pre-processing of the acquired omni-directional image at operation S110.

After performing the pre-processing of the omni-directional image, the controller 50 extracts a current line from the omni-directional image at operation S120, and calculates a correlation coefficient (i.e., a first correlation coefficient) between the extracted current line and a landmark line of each reference node using an equation, such as, Equation 1 according to an FFT scheme at operation S130.

Figure 8:
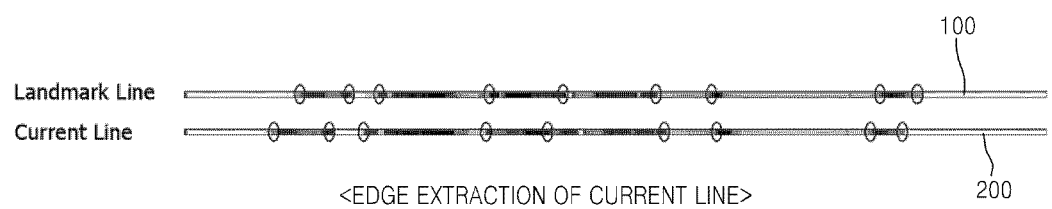
FIG. 8 is a diagram illustrating an edge extracting method between a current line of the omni-directional image illustrated in FIG. 5 and a landmark line of a reference node according to the present general inventive concept.
Figure 9:
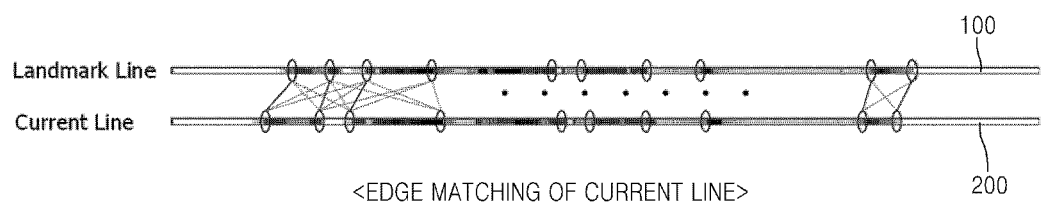
FIG. 9 is a diagram illustrating an edge matching method between a current line of the omni-directional image illustrated in FIG. 5 and a landmark line of a reference node according to the present general inventive concept.
Figure 10:
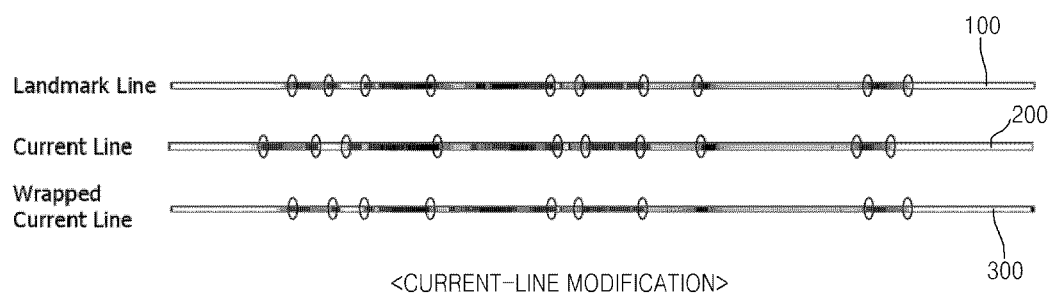
FIG. 10 illustrates a modified current line of the omni-directional image illustrated in FIG. 5 according to the present general inventive concept.

After calculating the first correlation coefficient, the controller 50 selects a number (M) of nodes having a correlation coefficient higher than a predetermined correlation coefficient at operation S140, for example the first correlation coefficient, and modifies the current line at operation S150, such that same spatial objects can be located at a same location of the current line in association with the M candidate nodes. As a result, the resultant data becomes insensitive to location error and noise. As illustrated in FIG. 8, the controller 50 can extract an edge between a current line 200 of the omni-directional image and a landmark line 100 of each M candidate node, as denoted by circles in FIG. 8. In this case, the edge indicates an end point at which each RGB of the current line changes by a predetermined value or more. As illustrated in FIG. 9, the edge of the extracted current line 200 of the omni-directional image is matched with the edge of the landmark line 100 of the selected candidate node. Thereafter, as illustrated in FIG. 10, the current line is modified on the basis of the matched edge, and the current line of the omni-directional image is modified as a wrapped current line 300. That is, by the wrapped current line 300, the same spatial objects can be located at the same location on the current line as in the landmark line.

After modifying the current line of the omni-directional image, the controller 50 re-calculates a correlation coefficient (i.e., a second correlation coefficient) between a wrapped current line of the omni-directional image and each landmark line of the M candidate nodes at operation S160, and selects a number (N) of nodes (where N<M) having a higher correlation coefficient (i.e., the second correlation coefficient) between the wrapped current line of the omni-directional image and each landmark line of the M candidate nodes. Therefore, the location error and noise encountered by the moving object can be removed, such that the controller 50 can correctly and reliably recognize that the robot 10 is located in the vicinity of the N nodes, the number of which is less than the number of M nodes.

Figure 11:
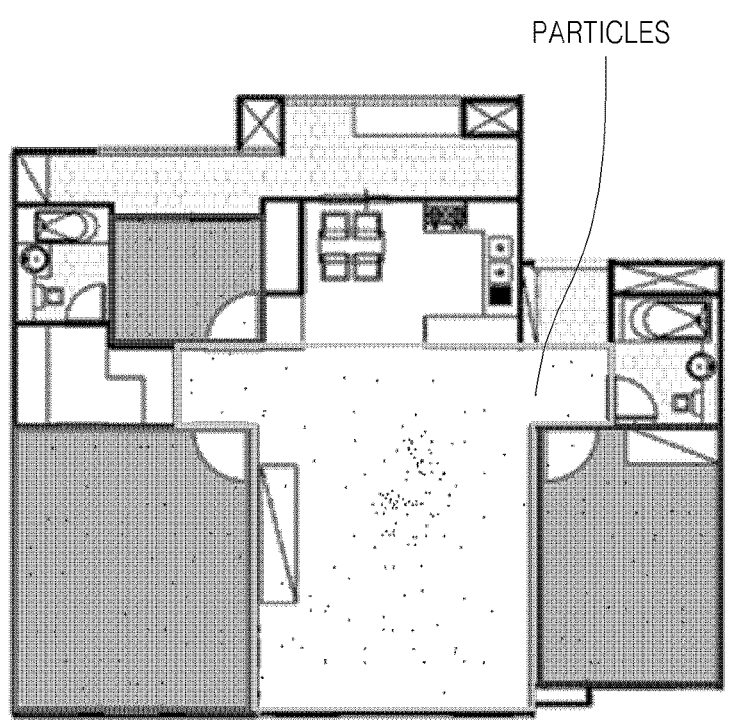
FIG. 11 illustrates a dispersal of specific particles on an overall robot-locatable area at random according to the present general inventive concept.

However, in the case of using the above-mentioned method, the controller 50 can recognize only specific information indicating which one of nodes is adjacent to the robot 10, and cannot correctly recognize the robot location on the map. In order to correctly recognize the current location of the robot 10 using a stochastic approach of a particle filtering process, the controller 50 generates particles using the correlation coefficient (i.e., the second correlation coefficient) on the basis of the selected N nodes, disperses the particles on all the robot-locatable areas on the map at random at step S180, and predicts a current location of the robot 10 by calculating a probability value of each particle at operation S190. In other words, the particles are uniformly dispersed on the predicted previous location (Xt-1) of the robot 10 and all the robot-locatable areas expected by a driving command (Ut) of the robot 10. The distribution of the particles is configured in a form of a Gaussian distribution as illustrated in FIG. 11. A standard deviation of the Gaussian distribution is determined by an error of the robot previous location (Xt-1) and a moving error. If the location of the robot 10 is suddenly changed to another location because the user compulsorily moves the robot 10 to another location, such that a kidnap problem occurs, the particles are dispersed on all the areas of the map at random.

Figure 12:
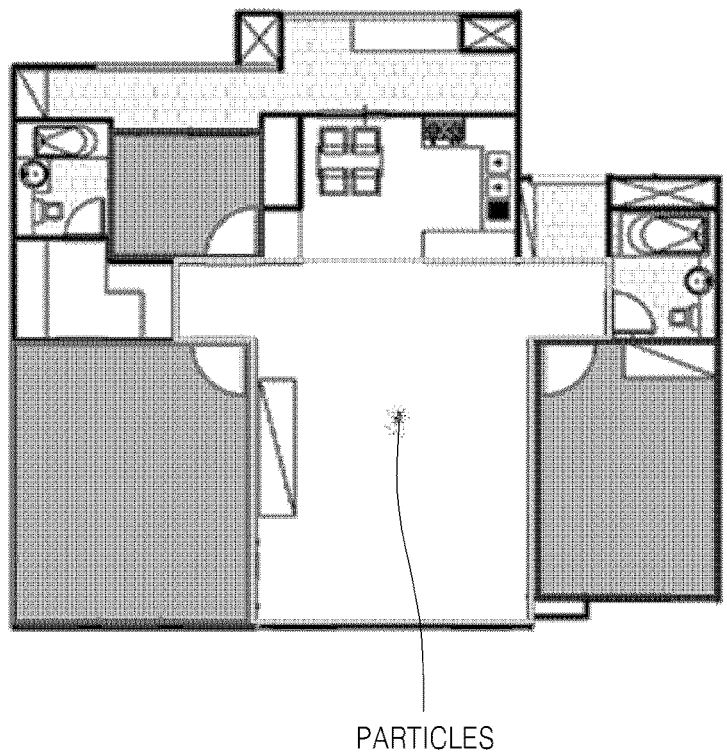
FIG. 12 illustrates the dispersed particles of FIG. 11 which have been collected at a specific point according to a particle filtering method according to an embodiment of the present general inventive concept.

The probability that the robot 10 may be located at each particle is calculated on the basis of the correlation coefficient between individual nodes. The current-location (Xt) particle is re-sampled on the basis of the calculated probability. In this way, the controller 50 can predict the current location of the robot 10 as illustrated in FIG. 12. In other words, a higher correlation coefficient of a node indicates a higher probability of locating the robot 10 at that node. Therefore, a weight is assigned to each particle, and the dispersed particles are extracted at random on the basis of a resultant value in which the weight is considered. The above-mentioned operations are repeated. In the case of secondly dispersing the particles, most particles are dispersed at a previous location, and some particles are then dispersed at the remaining areas other than the previous location. By repetition of the above-mentioned operations, the particles are collected at a single point as denoted by FIG. 12. Although any one of the particles can be extracted from among the collected particles, the location of the extracted particle seems to be almost the same, such that the current location of the robot 10 can be recognized.

Various embodiments of the present general inventive concept can be embodied as computer readable codes on a computer readable recording medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

As is apparent from the above description, the present general inventive concept acquires an image of 360° in a vicinity of an omni-directional camera, can quickly calculate a correlation coefficient between a current line of the acquired 360° image and a landmark line of each node of a pre-stored map using the FFT scheme, and can more quickly recognize which one of nodes is adjacent to the robot.

The present general inventive concept also can perform a particle filtering process on a basis of the correlation coefficient calculated by the FFT scheme, can quickly and correctly recognize the robot location, can solve a kidnap problem of the robot, and can increase a reliability of data indicating which one of the nodes is adjacent to the robot.

In association with some nodes having a high correlation coefficient from among the correlation coefficients calculated by the FFT scheme, the present general inventive concept can modify a current line of the omni-directional image on the basis of landmark lines of the selected nodes, such that the resultant correlation coefficient becomes insensitive to noise and has higher accuracy.

The omni-directional camera to implement the robot localization can be manufactured at low costs, such that the system to locate a moving robot can also be implemented at low costs. As a result, the price competitiveness of the system to locate the moving robot according to the present general inventive concept is higher than that of a high-priced laser-range sensor system.

The present general inventive concept can also predict a real-time location of the robot capable of moving indoors without attaching a mark to the robot, and the resultant data can be insensitive to an error of the correlation coefficient.

The present general inventive concept can also calculate a specific calculation at high speed to recognize the robot location, and can reduce the size of a manufactured map.

Although a few embodiments of the present general inventive concept have been shown and described, it will be appreciated by those skilled in the art that changes may be made in these embodiments without departing from the principles and spirit of the general inventive concept, the scope of which is defined in the claims and their equivalents.

The invention claimed is:

1. A method to locate a robot using an omni-directional image, the method comprising:
   acquiring the omni-directional image from a robot;
   extracting a predetermined current line from the acquired omni-directional image;
   calculating a correlation coefficient between the extracted current line of the robot and each pre-stored landmark line of nodes corresponding to locations in a robot-locatable area using a Fast Fourier Transform (FFT);
   selecting M nodes at which the calculated correlation coefficient is equal to or higher than a predetermined value;
   modifying a current line of the robot such that same spatial objects are located at a same location on a basis of the landmark lines of the selected M nodes to create a wrapped current line;
   calculating a correlation coefficient between the wrapped current line of the robot and the landmark lines of the M nodes;
   selecting N nodes at which the calculated correlation coefficient is equal to or higher than a predetermined correlation coefficient such that N<M; and
   recognizing a location of the robot on a basis of the selected N nodes,
   wherein the pre-stored landmark lines of the nodes are lines pre-extracted from omni-directional images acquired when the robot is located at the nodes in the robot-locatable area.

2. The method of claim 1, wherein the predetermined current line is a circumference spaced apart from an origin of the omni-directional image by a predetermined location.

3. The method of claim 1, wherein the correlation coefficient between the current line of the robot and each pre-stored landmark line of the nodes is calculated by the following equation:

$$\rho(\tau) = \frac{C_{xy}(\tau)}{\sqrt{C_{xx}(0) \cdot C_{yy}(0)}} \quad \text{[Equation]}$$

wherein $\rho(\tau)$ is a correlation coefficient, $\tau$ is a rotation angle of the robot, $C_{xy}$ is a cross-correlation value, and $C_{xx}$, and $C_{yy}$, are correlation values.

4. The method of claim 1, wherein the modifying of the current line comprises:
   extracting an edge of the current line of the robot and an edge of each landmark line of the M nodes;
   matching the edge of the current line of the robot with the edge of the landmark line of the M nodes; and
   modifying the current line of the robot on a basis of the matched edge, such that the same spatial objects are located at the same location of the current line.

5. The method of claim 4, wherein the edge is indicative of an end point at which each RGB of the current line changes by a predetermined value or more.

6. A method to locate a robot with an omni directional camera mounted thereon, the method comprising:
   setting a number landmark lines for a predetermined number of nodes corresponding to locations within a robot-locatable area;
   acquiring an omni directional image from the robot;
   extracting a current line from the acquired image;
   calculating a correlation coefficient between the current line and the landmark lines for each node;
   selecting a first number of nodes at which the calculated correlation coefficient is equal to or higher than a predetermined value;
   modifying the current line into a plurality of wrapped current lines such that spatial objects in each wrapped current line are at the same location with corresponding spatial objects in each of the landmark lines for the first number of nodes;
   calculating a second correlation coefficient between the wrapped current lines and the landmark lines of the first number of nodes;
   selecting a second number of nodes among the first number of nodes at which the second calculated correlation coefficient is equal to or higher than a second predetermined value; and
   recognizing a location of the robot on the basis of the selected second number of nodes; and
   determining a location of the robot based on the calculated correlation coefficient,
   wherein the landmark lines for the predetermined number of nodes are lines pre-extracted from omni-directional images acquired when the robot is located at the predetermined number of nodes in the robot-locatable area.

7. The method of claim 6, wherein the calculating of the correlation coefficient uses a Fast Fourier Transform (FFT) method.

8. The method of claim 6, wherein the modifying of the current line comprises:
   extracting an edge of the current line and an edge of each landmark line of the first number of nodes; and
   matching the edge of the current line with the edge of the landmark lines.

9. The method of claim 8, wherein the edge is an end point at which each RGB of the current line changes by at least a third predetermined value.

10. The method of claim 6, wherein the predetermined value and the second predetermined value are the same.

11. A robot locating apparatus, comprising:
    a robot body;
    an omni-directional camera mounted on the robot body to acquire an omni-directional image; and
    a controller to extract a predetermined current line from the acquired omni-directional image, to calculate a correlation coefficient between the extracted current line of the robot and each pre-stored landmark line of nodes corresponding to locations of a robot locatable area using a Fast Fourier Transform (FFT), to select M nodes at which the calculated correlation coefficient is equal to or higher than a predetermined value, to modify the current line of the robot such that same spatial objects are located at a same location on both the current line and the landmark lines on a basis of the landmark lines of the selected M nodes to create a wrapped current line, to calculate a correlation coefficient between the wrapped current line of the robot and the landmark lines of the M nodes, to select N nodes at which the calculated correlation coefficient is equal to or higher than a predetermined correlation coefficient such that N<M, and to recognize a location of the robot based on the selected N nodes, wherein the pre-stored landmark lines of the nodes are lines pre-extracted from omni-directional images acquired when the robot is located at the nodes in the robot-locatable area.

12. The apparatus of claim 11, wherein the controller is mounted apart from the robot body and communicates with at least one of the robot body and the omni-directional camera.

* * * * *